(12) United States Patent
Nakayama

(10) Patent No.: US 9,152,015 B2
(45) Date of Patent: Oct. 6, 2015

(54) ELECTRONIC DEVICE

(75) Inventor: Shusuke Nakayama, Tokyo (JP)

(73) Assignee: KYOCERA Corporation, Kyoto (JP)

(*) Notice: Subject to any disclaimer, the term of this patent is extended or adjusted under 35 U.S.C. 154(b) by 126 days.

(21) Appl. No.: 13/580,376

(22) PCT Filed: Jan. 26, 2011

(86) PCT No.: PCT/JP2011/051404
§ 371 (c)(1),
(2), (4) Date: Aug. 21, 2012

(87) PCT Pub. No.: WO2011/102192
PCT Pub. Date: Aug. 25, 2011

(65) Prior Publication Data
US 2012/0314120 A1  Dec. 13, 2012

(30) Foreign Application Priority Data
Feb. 22, 2010  (JP) ................. 2010-036150

(51) Int. Cl.
*G03B 9/08* (2006.01)
*H04N 5/232* (2006.01)
(Continued)

(52) U.S. Cl.
CPC ........ *G03B 13/36* (2013.01); *G02B 7/08* (2013.01); *G03B 17/02* (2013.01); *G06F 3/041* (2013.01); *H04N 5/23212* (2013.01); *H04N 5/23216* (2013.01)

(58) Field of Classification Search
CPC .............. H04N 5/232; H04N 5/23216; H04N 5/23212; H04N 5/2353; G06K 9/00; G03B 15/03; G03B 17/38; G03B 7/00; G03B 19/12; G03B 9/00; G03B 9/08; G03B 13/36; G03B 17/02; G02B 7/08; G06F 3/041

USPC ............ 348/345–356, 333.01; 382/115, 116, 382/124, 126, 120, 121; 396/184, 194, 235, 396/502, 456, 357, 444, 452, 44
See application file for complete search history.

(56) References Cited

U.S. PATENT DOCUMENTS 5,204,709 A * 4/1993 Sato .............................. 396/263
7,319,488 B2 * 1/2008 Sagiya ......................... 348/362
(Continued)

FOREIGN PATENT DOCUMENTS

CN  101465906 A  6/2009
JP  62-112143 A  5/1987
(Continued)

OTHER PUBLICATIONS
International Search Report; PCT/JP2011/051404; Apr. 26, 2011.
(Continued)

*Primary Examiner* — Tuan Ho
*Assistant Examiner* — Marly Camargo
(74) *Attorney, Agent, or Firm* — Studebaker & Brackett PC

(57) ABSTRACT

An electronic device, which accepts inputs in a plurality of levels according to pressing loads, includes: a control unit, which performs an autofocus process of automatically adjusting a focus with respect to the photographic subject when a load detecting unit detects a pressing load that satisfies a load standard for accepting a first-level input, and controls so that a still image is acquired, when the load detecting unit detects a pressing load that satisfies a load standard for accepting a second-level input higher than the load standard for accepting the first-level input, wherein, from when the autofocus process starts to when adjustment of the focus with respect to the photographic subject is completed, when the load detecting unit detects the pressing load that satisfies the load standard for accepting the second-level input, the control unit controls so that the still image is not acquired.

1 Claim, 9 Drawing Sheets

(51) Int. Cl.
*G06F 3/041* (2006.01)
*G03B 13/36* (2006.01)
*G03B 17/02* (2006.01)
*G02B 7/08* (2006.01)
*H04N 5/235* (2006.01)

(56) References Cited

U.S. PATENT DOCUMENTS

| | | | |
|---|---|---|---|
| 7,982,721 B2 * | 7/2011 | Hio | 345/173 |
| 2006/0007341 A1 * | 1/2006 | Nakamura et al. | 348/333.05 |
| 2007/0052837 A1 * | 3/2007 | Onozawa | 348/345 |
| 2008/0008465 A1 * | 1/2008 | Morimoto | 396/89 |
| 2008/0202824 A1 | 8/2008 | Philipp et al. | |
| 2009/0034955 A1 | 2/2009 | Kunishige et al. | |
| 2009/0041444 A1 * | 2/2009 | Nakai et al. | 396/48 |
| 2009/0163242 A1 | 6/2009 | Chang | |
| 2012/0306799 A1 * | 12/2012 | Nakayama | 345/173 |
| 2013/0050532 A1 * | 2/2013 | Ueda et al. | 348/239 |

FOREIGN PATENT DOCUMENTS

| | | |
|---|---|---|
| JP | 4-125534 A | 4/1992 |
| JP | 5-4119 U | 1/1993 |
| JP | 8-262519 A | 10/1996 |
| JP | 2006-39745 A | 2/2006 |
| JP | 2006-134609 A | 5/2006 |
| JP | 2006-227327 A | 8/2006 |
| JP | 2007-225837 A | 9/2007 |
| JP | 2007-286185 A | 11/2007 |
| JP | 2007-322694 A | 12/2007 |
| JP | 2008-198205 A | 8/2008 |
| JP | 2009-48126 A | 3/2009 |

OTHER PUBLICATIONS

An Office Action; "Notice of Reasons for Rejection," issued by the Japanese Patent Office on Feb. 4, 2014, which corresponds to Japanese Patent Application No. 2012-500535 and is related to U.S. Appl. No. 13/580,376; with English language concise explanation.

"Notification of the First Office Action," issued by the State Intellectual Property Office of China on Mar. 4, 2014, which corresponds to Chinese Patent Application No. 201180010403.9 and is related to U.S. Appl. No. 13/580,376; with English language translation.

* cited by examiner (CONT.)

(FIG. 4 CONTINUED)
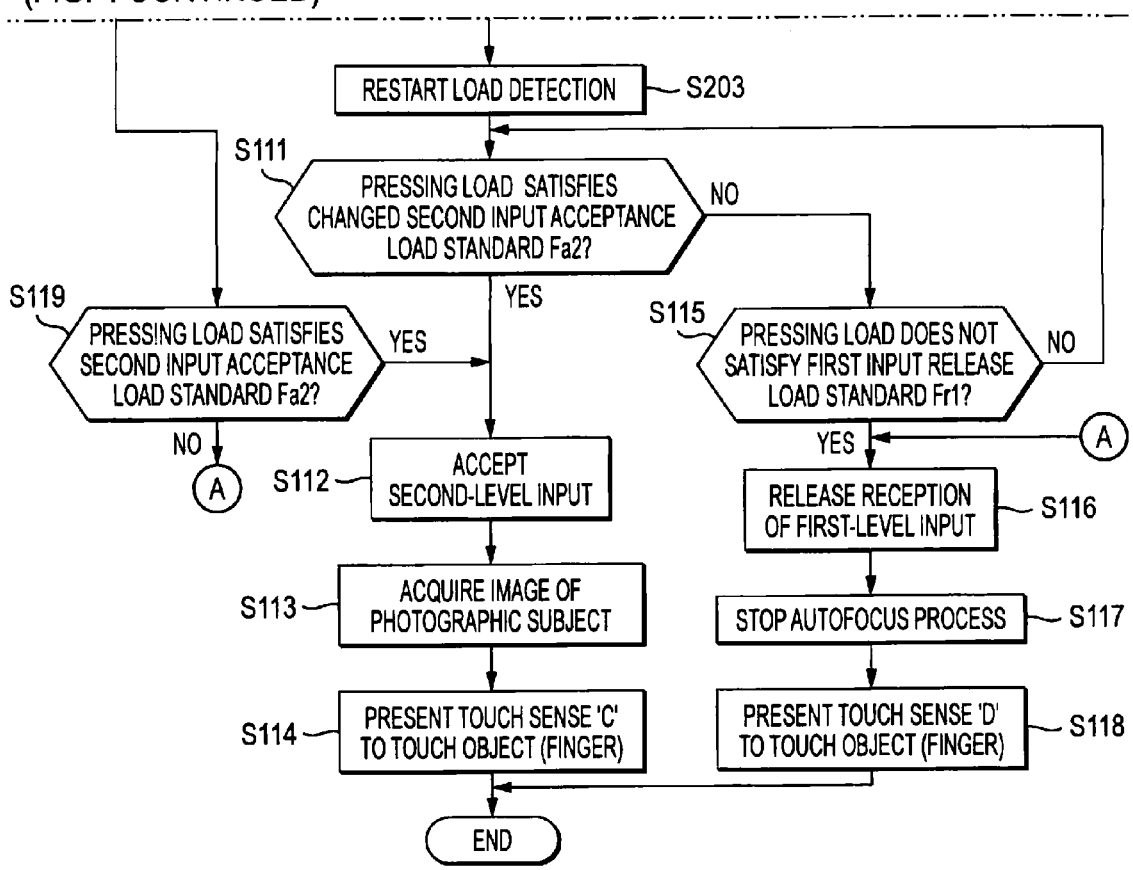

ELECTRONIC DEVICE

TECHNICAL FIELD

The present invention relates to an electronic device, and specifically, to an electronic device which accepts inputs in a plurality of levels based on pressing loads.

BACKGROUND ART

Previously, electronic devices such as portable phones and digital cameras use mechanical switches, such as tactile switches and membrane switches, as an input unit enabling users to perform manipulation input. Specifically, recently, there are many small terminal devices having a variety of functions, and these terminal devices includes keys, buttons, and the like made of various kinds of switches on their faces.

As for these switches, in general, one operation (or program) is assigned to one switch. For example, in a case of a portable phone, when a pressing input to a numeral keypad is detected, a number corresponding to each key is output. Alternatively, when a pressing input to a numeral keypad is detected, a menu screen is displayed.

However, for example, in a case where it is desired to sequentially perform a plurality of operations, when each operation is performed using a separate switch to which the corresponding operation has been assigned, a lot of trouble may be required. For this reason, it is possible to consider a configuration in which one switch is used to perform operations in order whenever an input to the switch is detected. However, in this input type, the order in which the operations are performed is to be defined in advance. Therefore, it is impossible for a user to perform manipulation for immediately performing a desired arbitrary operation.

In order to solve the above-mentioned problem, there has been proposed an input device capable of assigning a plurality of operations based on input types to one switch (see, for example, Patent Document 1).

The input device disclosed in Patent Document 1 can accept inputs in two levels based on pressing loads regarding inputs when manipulation is performed.

FIG. 8 is a cross-sectional view schematically illustrating an internal configuration of a manipulation device 100 disclosed in Patent Document 1. As shown in FIG. 8, the manipulation device 100 includes a first detecting unit 200, a second detecting mean 300, and membrane switches, and the second detecting mean 300 is provided below the first detecting unit 200 (in a pressing direction). A portion to be directly touched by a finger F of a user is made of a flexible member, and when the user presses the manipulation device 100, the flexible member bends so as to transfer the pressing load to the first detecting unit 200. When the user presses a position corresponding to a first contact point S3 with the finger F with a low weight (a first manipulation force), a first upper conductive portion 201c and a first lower conductive portion 202c come into contact with each other, so that the first contact point S3 becomes conductive. This is considered as a first-level input. Also, when the user presses the corresponding position with the finger F with a high weight (a second manipulation force) larger than the low weight, a second upper conductive portion 301c and a second lower conductive portion 302c come into contact with each other, so that a second contact point T3 becomes conductive. This is considered as a second-level input. Furthermore, FIG. 8 shows a situation in which the manipulation device 100 was pressed by the second manipulation force of the finger F of the user, and thus the first contact point S3 detects not only the first-level input and the second contact point T3 also detects the second-level input.

This input device accepts user's inputs in two levels based on the pressing loads of the inputs, and thus it is possible to assign different operations to those individual levels. In a case of using this input device, the user can use one switch (input device) to differentially perform a plurality of inputs by adjusting a pressing force when performing one operation of performing a pressing input to the switch.

In other words, according to this input device which accepts two-level inputs, the user can perform a first-level input by keeping a state in which a button is pressed by a weak pressing force. This input state is called 'a half-press', and is hereinafter referred to as 'a first-level input'. Further, according to this input device, the user can perform a second-level input by pressing the button with a pressing force stronger than that of the first-level input. This input state is called 'a full-press', and is hereinafter referred to as 'a second-level input'.

As an example of the typical purposes of that input device which accepts inputs in two levels based on pressing loads by a mechanical switch, there is a shutter button of a camera. In general, in a portable terminal or the like having a digital camera function and the like, a user performs a 'half-press' input as a first-level input, thereby enabling an imaging process. In this state, the user performs a 'full-press' input as a second-level input, thereby performing an operation of clicking the shutter. In this way, it is possible to assign different operations by the first-level input and the second-level input, and the user can distinguish the different operations and perform manipulation according to a desired operation.

Also, the input device which accepts multi-level inputs based on pressing loads is not limited to the mechanical switch. For example, as for a touch panel type input device configured by combining a display device and a position input device, there has been suggested an input device which accepts multi-level inputs based on pressing loads by performing a process according to software (see, for example, Patent Document 2).

A touch panel type input device disclosed in Patent Document 2 includes a position detecting unit detecting a pressed position of a touch panel provided to a face portion of a display screen, and a pressure detecting unit detecting a pressing force on the touch panel. In this input device, it is possible to perform inputs of two systems, i.e. an input based on a detection position of the position detecting unit, and multi-level inputs based on the detection of the pressure detecting unit, by one time pressing manipulation on the touch panel.

According to this input device, when a user presses the touch panel on the display screen, it is possible to perform an input of a first system based on the pressed position, and at the same time, it is possible to perform an input of a second system based on the pressing force on the touch panel at that time. Then, based on the pressing force on the touch panel, selection of multiple levels, that is, three or more levels becomes possible. Therefore, the user can perform inputs of two systems by performing pressing manipulation on the touch panel once, and thus it is possible to reduce the number of times pressing manipulation.

As described above, even in an input device using a mechanical switch, and even in an input device using a touch panel, it is possible to accept inputs in a plurality of levels based on pressing loads. In this input device, since inputs are distinctively accepted in a plurality of levels based on pressing loads, it is possible to group a plurality of functions for one button or key. Therefore, it is possible to reduce the number of keys and buttons regarding manipulation inputs.

Specifically, in a case of small terminals like portable terminals, since a case of each individual terminal is small, it is difficult to provide a lot of keys and buttons to the main body of the terminal. Therefore, in a portable terminal, when it is possible to properly use a plurality of functions by using a few keys and buttons, it is possible to reduce keys and buttons which is to be provided to the main body of the terminal.

CITATION LITERATURE

Patent Document

Patent Document 1: Japanese Patent Application Laid-Open No. 2006-134609
Patent Document 2: Japanese Patent Application Laid-Open No. 2006-039745

SUMMARY OF INVENTION

However, in the manipulation device 100 disclosed in Patent Document 1, the specification of each of the disposition, configuration, and the like of each of the mechanical switches of the first detecting unit 200 and the mechanical switches of the second detecting mean 300 is defined in advance at the time of design or manufacture. Further, the degree of flexibility of each of the members configuring the mechanical switches is also determined at the time of product manufacture. Therefore, generally, it is difficult to change the specification of this configuration, later.

For this reason, in this input device, a user has no choice but to actually perform input manipulation and sensuously grasp what degree of pressing load the first-level input is accepted by, and what degree of pressing load the second-level input is accepted by, by trial and error. In other words, each user needs to match user's own pressing force to the defined pressing loads required by the input device.

In general, in delicate work and a fine adjustment of increasing or decreasing the force of a fingertip, there are significant differences between users according to their strong and weak points. Therefore, light-handed persons may naturally perform some kinds of input manipulation without special difficulties. However, general all users may always immediately cope with those kinds of input manipulation.

For this reason, even when a user wants to stop at the first-level input for the input device, the user may fail to appropriately performing fine adjustment of increasing or decreasing the force and the pressing force may be too increased, so that the second-level input is unintentionally performed. Specifically, since the user cannot visibly recognize the degree of load when performing input manipulation according to pressing, it is difficult for the user to accurately grasp how much pressing force is to be adjusted for making an input of each level being accepted.

These circumferences are caused even in the case of the above-mentioned Patent Document 2. The touch panel type input device disclosed in Patent Document 2 can not accept inputs in a plurality of levels based on pressing loads unless thresholds for pressing loads to be accepted by a pressure detecting unit are set in advance. Therefore, each user needs to match user's own pressing force to the defined pressing loads required by the input device. For this reason, if a user wants to stop at the first-level input, the user may fail to appropriately performing fine adjustment of increasing or decreasing the force so that the pressing force too increases, so that the second-level input is unintentionally performed.

As described above, when an input as a manipulation input unintended by the user is performed, the input device performs an operation according to a reasonable procedure, but the operation is a mere malfunction for the user. In a case of applying the above-mentioned input device to a shutter button of a camera, when the pressing force of the user is not appropriately performed so that the second-level input is accepted at a time beyond the first-level input, a shutter is clicked before the autofocus process appropriately operates and is completed. In this case, since the autofocus process does not approximately operate, an out-of-focus still image (in which a photographic subject is not in focus) may be acquired.

Therefore, an object of the present invention made in view of those circumferences is to provide an electronic device which accepts inputs based on pressing loads and reduces a risk that an autofocus process is not appropriately operated and an out-of-focus still image is to be acquired.

In order to solve the above-described problem, an electronic device according to a first aspect of the present invention, which accepts inputs in a plurality of levels according to pressing loads, comprises: an imaging unit, which acquires an image of a photographic subject; a load detecting unit, which detects a pressing load of an input according to pressing; and a control unit, which performs an autofocus process of automatically adjusting a focus with respect to the photographic subject when the load detecting unit detects a pressing load that satisfies a load standard for accepting a first-level input, and controls so that a still image is acquired, when the load detecting unit detects a pressing load that satisfies a load standard for accepting a second-level input higher than the load standard for accepting the first-level input, wherein, from when the autofocus process starts to when adjustment of the focus with respect to the photographic subject is completed, when the load detecting unit detects the pressing load that satisfies the load standard for accepting the second-level input, the control unit controls so that the still image is not acquired.

Further, in an electronic device according to a second aspect of the present invention, when the adjustment of the focus with respect to the photographic subject is completed, the control unit controls so that a load standard higher than a pressing load being detected by the load detecting unit is set as the load standard for accepting the second-level input.

Further, an electronic device according to a third aspect of the present invention, which accepts inputs in a plurality of levels according to pressing loads, comprises: an imaging unit, which acquires an image of a photographic subject; a load detecting unit, which detects a pressing load of an input according to pressing; and a control unit, which performs an autofocus process of automatically adjusting a focus with respect to the photographic subject when the load detecting unit detects a pressing load that satisfies a load standard for accepting a first-level input, and controls so that, when the load detecting unit detects a pressing load that satisfies a load standard for accepting a second-level input higher than the load standard for accepting the first-level input, a still image is acquired, wherein, from when the autofocus process starts to when adjustment of the focus with respect to the photographic subject is completed, the control unit controls so that the load detecting unit does not detect the pressing load.

Further, in an electronic device according to a fourth aspect of the present invention, when the adjustment of the focus with respect to the photographic subject is completed, the control unit controls so that a load standard higher than a pressing load being detected by the load detecting unit is set as the load standard for accepting the second-level input.

Further, an electronic device according to a fifth aspect of the present invention, an imaging unit, which acquires an image of a photographic subject; a load detecting unit, which detects a pressing load of an input according to pressing; and a control unit, which controls the imaging unit so that the imaging unit performs an autofocus process of automatically adjusting a focus with respect to the photographic subject when the load detecting unit detects a pressing load that satisfies a load standard for accepting an input, wherein, from when the autofocus process starts to when adjustment of the focus with respect to the photographic subject is completed, the control unit controls so that the load detecting unit does not detect the pressing load, and wherein, after the adjustment of the focus with respect to the photographic subject is completed, the control unit controls so that, when the load detecting unit detects an amount of load change exceeding a predetermined amount of load change per unit time, a still image is acquired.

According to the above-mentioned electronic devices, from when the autofocus process starts to when focus adjustment with respect to a photographic subject is completed, any still image is not acquired. Therefore, it is possible to reduce a risk that the autofocus process is not appropriately operated and an out-of-focus still image is acquired.

REFERENCE SIGNS LIST

11 TOUCH SENSOR
11a TOUCH FACE
12 LOAD DETECTING UNIT
13 TOUCH-SENSE PRESENTING UNIT
14 IMAGING UNIT
15 DISPLAY UNIT
16 STORAGE UNIT
17 CONTROL UNIT

DESCRIPTION OF EMBODIMENTS

Hereinafter, embodiments of an electronic device according to the present invention will be described with reference to the drawings.

First Embodiment

Figure 1:
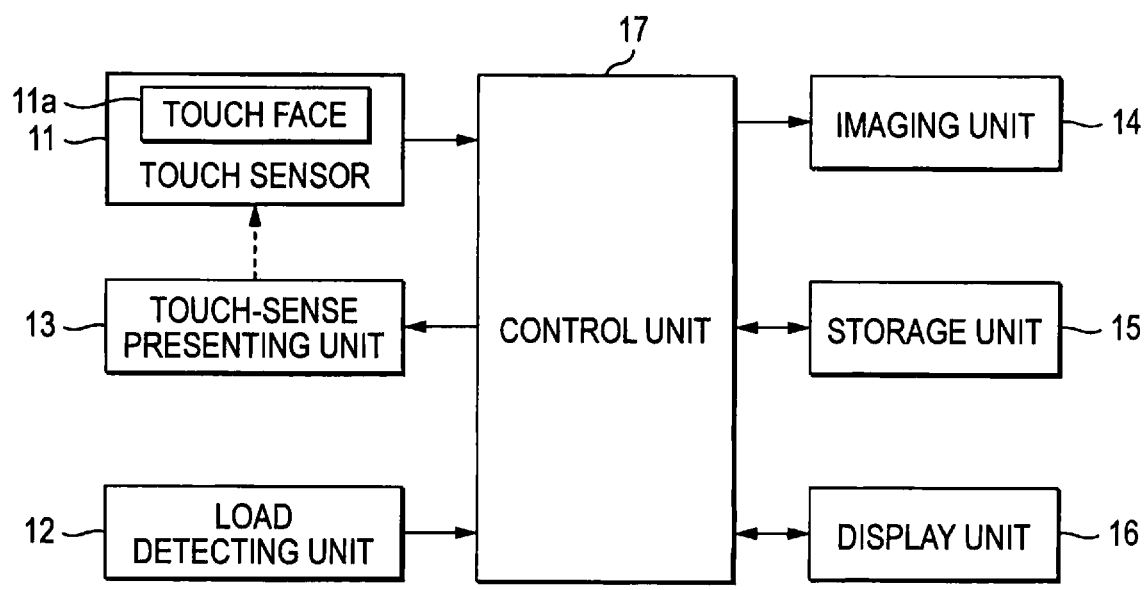
FIG. 1 is a functional block diagram of an electronic device according to an embodiment of the present invention.

FIG. 1 is a functional block diagram of an electronic device according to an embodiment of the present invention. As shown in FIG. 1, the electronic device includes a touch sensor 11, a load detecting unit 12, a touch-sense presenting unit 13, an imaging unit 14, a storage unit 15, a display unit 16, and a control unit 17 for controlling an entire operation.

The touch sensor 11 detects touch of a touch object such as a finger or a stylus on a touch face 11a and is configured in a resistive manner, a capacitive manner, an optical manner, or the like, and is disposed on the display unit 16. The load detecting unit 12 detects a pressing load of an input according to pressing, and detects, for example, a pressing load on the touch face 11a of the touch sensor 11. The load detecting unit 12 is configured by using elements such as strain gauge sensors or piezoelectric elements, which react against loads. The touch-sense presenting unit 13 vibrates the touch sensor 11 and is configured by using, for example, piezoelectric elements.

The imaging unit 14 is configured by an optical system such as an imaging lens, a zoom lens, a focus lens, and a stop, and a solid-state imaging device such as a CCD (Charged Coupled Device) or a CMOS (Complementary Metal Oxide Semiconductor), and a user can take an image of a photographic subject by the above-mentioned imaging unit 14.

The storage unit 15 stores various applications, various kinds of input information, and the like, and also serves as a work memory or the like. Specifically, in the present embodiment, the storage unit 15 stores a load standard for accepting an input of each level, and a load standard for releasing acceptance of an input, and temporarily stores a pressing load on the touch face 11a detected by the load detecting unit 12, and the like to be processed in the control unit 17.

The display unit 16 is for displaying various objects for input and the like, and thus is configured by using, for example, a liquid crystal display, an organic EL display panel, or the like. Specifically, in the present embodiment, the display unit 16 displays taken images based on a taken image signal output from the imaging unit 14. As display modes of the display unit 16, there are a display mode based on a so-called live-view function in which taken images are displayed as dynamic images in real time and a mode in which taken images are displayed as still images by an operation of clicking a so-called shutter (an operation of acquiring still images). Further, the control unit 17 detects touch of a touch object on a photographic subject displayed on the display unit 16 by the live-view function, on the basis of position information output from the touch sensor 11.

The control unit 17 is configured by, for example, a CPU, and controls the operation of each unit on the basis of the position information from the touch sensor 11 and pressing load information from the load detecting unit 12. Further, the control unit 17 controls the optical system of the imaging unit 14, so that an autofocus process of automatically adjusting a focus with respect to a photographic subject is performed. Since autofocus processes are known techniques, in the present invention, it is possible to apply various autofocus processes without specifically limiting the kinds of autofocus processes. Further, when touch of the touch object on a photographic subject displayed on the display unit 16 by the live-view function is detected, it is possible to start the autofocus process with respect to the photographic subject.

Figure 2:
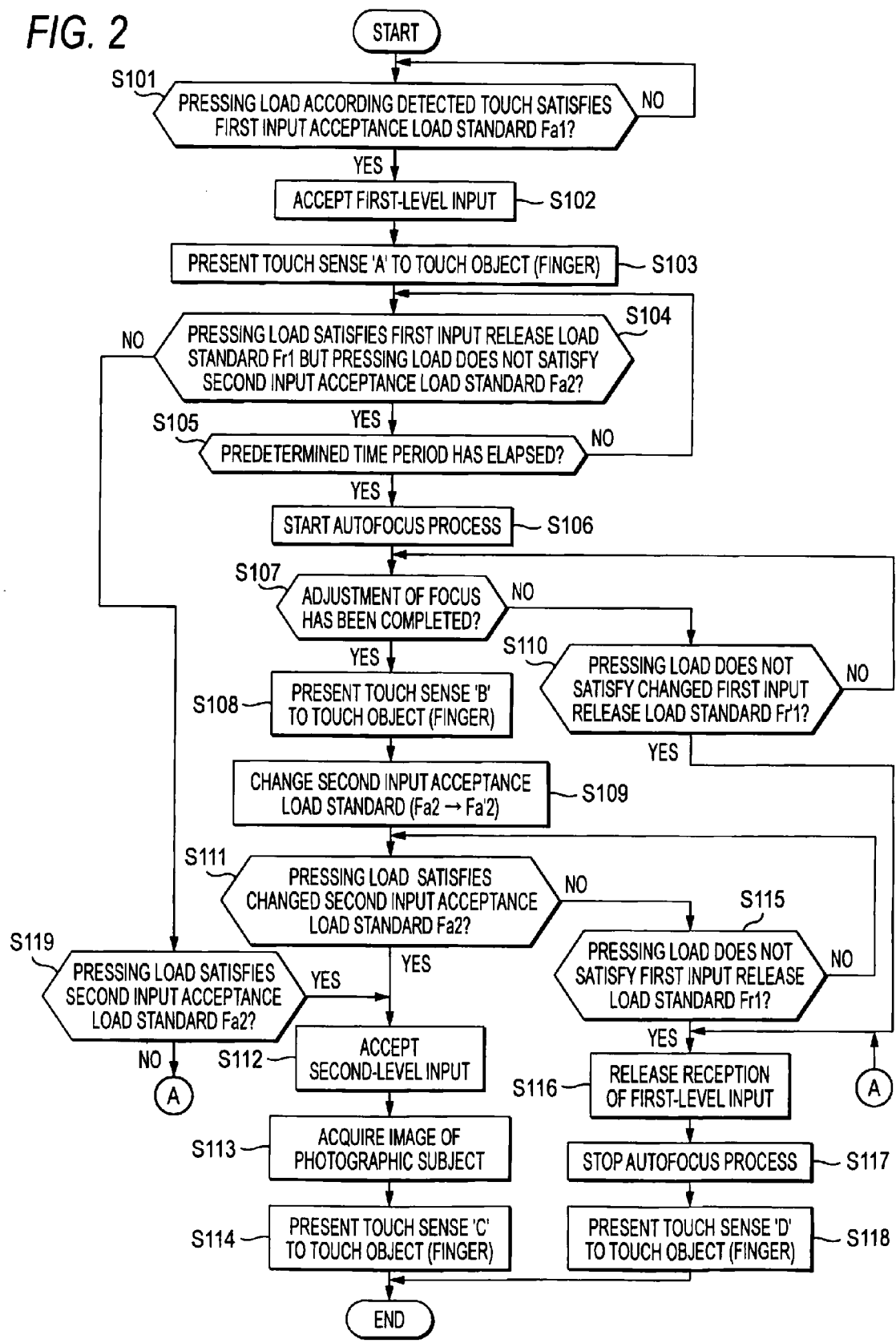
FIG. 2 is a flow chart illustrating an input process of an electronic device according to a first embodiment of the present invention.

Next, an input process of the electronic device according to the present embodiment will be described. FIG. 2 is a flow chart illustrating the flow of the input process of the electronic device according to the present embodiment. In this process, an image taking function is started, and an image including a photographic subject is displayed on the display unit 16 by the so-called live-view function.

First, the control unit 17 detects touch of the touch object such as a finger on the touch face 11a of the touch sensor 11 and determines whether a pressing load according to the touch of the touch object such as the finger detected by the load detecting unit 12 satisfies a load standard (referred to as 'a first input acceptance load standard') Fa1 for receiving a first-level input (step S101). In a case where the pressing load detected by the load detecting unit 12 satisfies the first input acceptance load standard Fa1, the control unit 17 accepts the first-level input (step S102).

Next, the control unit 17 controls the touch-sense presenting unit 13 so that the touch-sense presenting unit 13 presents a touch sense 'A' to the finger being in touch with the touch face 11a, for notifying a user of that the first-level input has been accepted (step S103). After step S103, the control unit 17 determines whether the pressing load according to the touch of the touch object detected by the load detecting unit 12 satisfies a first load standard (referred to as 'a first input release load standard') Fr1 for releasing the acceptance of the first-level input and does not satisfy a second load standard (referred to as 'a second input acceptance load standard') Fa2 for receiving a second-level input which is higher than the first input release load standard Fr1 and the first input acceptance load standard Fa1 (step S104). Here, in case that it is determined that the pressing load according to the touch of the touch object detected by the load detecting unit 12 satisfies the first input release load standard Fr1 and does not satisfy the second input acceptance load standard Fa2, the control unit 17 the process proceeds to step S105, and in case that it is not determined that way, the control unit 17 proceeds to step S119.

In step S105, the control unit 17 determines whether the load detecting unit 12 has continuously detected the pressing load, which satisfies the first input release load standard Fr1 and does not satisfy the second input acceptance load standard Fa2, for a predetermined time period (step S105). In case that it is determined in step S105 that the load detecting unit 12 has continuously detected the pressing load, which satisfies the first input release load standard Fr1 and does not satisfy the second input acceptance load standard Fa2, for the predetermined time period, the control unit 16 proceeds to step S106, and in case that it is determined that it is not continuously detected for the predetermined time period, the control unit 16 returns to step S104.

In step S106, the control unit 17 controls the optical system of the imaging unit 14 and the like so that an autofocus process starts to automatically adjust the focus with respect to a photographic subject. Here, the photographic subject, which is an object of the automatic focus adjustment, may be determined by touching of the user on the photographic subject displayed on the display unit 16 by the live-view function. After step S106, the control unit 17 determines whether the adjustment of the focus with respect to the photographic subject according to the control on the optical system of the imaging unit 14 and the like has been completed (the photographic subject is in focus (step S107). In case that it is determined that the adjustment of the focus with respect to the photographic subject has been completed, the control unit 17 controls the touch-sense presenting unit 13 so that the touch-sense presenting unit 13 presents a touch sense 'B' to the touch object, such as a finger, being in touch with the touch face 11a for notifying the user of that the adjustment of the focus with respect to the photographic subject has been completed (step S108). Here, the touch sense 'B' presented to the touch object may be the same as or different from the touch sense 'A'.

After step S108, the control unit 17 newly sets a second input acceptance load standard Fa'2 (changed second input acceptance load standard Fa'2) on the basis of the pressing load detected by the load detecting unit 12 when the adjustment of the focus with respect to the photographic subject was completed (step S109). The second input acceptance load standard Fa'2 is newly set to a load standard higher than the pressing load detected by the load detecting unit 12 when the adjustment of the focus with respect to the photographic subject was completed.

Meanwhile, in case that it is determined in step S107 that the adjustment of the focus with respect to the photographic subject has not been completed, the control unit 17 determines whether the pressing load detected by the load detecting unit 12 does not satisfy the first input release load standard Fr1 (step S110). In case that it is determined that the pressing load detected by the load detecting unit 12 does not satisfy the first input release load standard Fr1, the control unit 17 proceeds to step S116, and in case that it is determined that it is satisfied, the control unit 17 returns to step S107.

Meanwhile, after the second input acceptance load standard Fa'2 are newly set in step S109, the control unit 17 determines whether the pressing load detected by the load detecting unit 12 satisfies the changed second input acceptance load standard Fa'2 (step S111). In case that it is determined in step S111 that the pressing load detected by the load detecting unit 12 satisfies the changed second input acceptance load standard Fa'2, the second input is accepted (step S112), and a still image including the photographic subject is acquired (step S113). Here, acquisition of a still image is, for example, an aspect temporarily storing the still image in a RAM of the storage unit 15 or the like, or an aspect storing the still image in a ROM or the like.

After step S113, the control unit 17 controls the touch-sense presenting unit 13 so that the touch-sense presenting unit 13 presents a touch sense 'C' to the touch object, such as a finger, being in touch with the touch face 11a for notifying the user of that the still image has been acquired (step S114), and terminates the present process. Further, the touch sense 'C' presented to the touch object may be the same as or different from the touch sense 'A' or the touch sense 'B'.

Meanwhile, in case that it is determined in step S111 that the pressing load detected by the load detecting unit 12 does not satisfy the changed second input acceptance load standard Fa'2, the control unit 17 subsequently determines whether the pressing load does not satisfy the first input release load standard Fr1 (step S115). Here, in case that it is determined that the pressing load detected by the load detecting unit 12 does not satisfy the first input release load standard Fr1, the acceptance of the first-level input is released (step S116), and the autofocus process stops (step S117). After step S117, the control unit 17 controls the touch-sense presenting unit 13 so that the touch-sense presenting unit 13 presents a touch sense 'D' to the touch object, such as a finger, being in touch with the touch face 11a, for notifying the user of that the autofocus process has stopped (step S118), and terminates the present process. Further, the touch sense 'D' presented to the touch object may be the same as or different from the touch sense 'A', the touch sense 'B', or the touch sense 'C'.

Meanwhile, in case that it is determined in step S104 that the load detecting unit 12 is not detecting the pressing load which satisfies the first input release load standard Fr1 and does not satisfy the second input acceptance load standard Fa2, the control unit 17 proceeds to step S119. The control unit 17 determines whether the pressing load detected by the load detecting unit 12 satisfies the second input acceptance load standard Fa2. In case that it is determined that the pressing load satisfies the second input acceptance load standard Fa2, the control unit 17 proceeds to step S112, and in case that it is determined that it is not satisfied, the control unit 17 proceeds to step S116.

Figure 3:
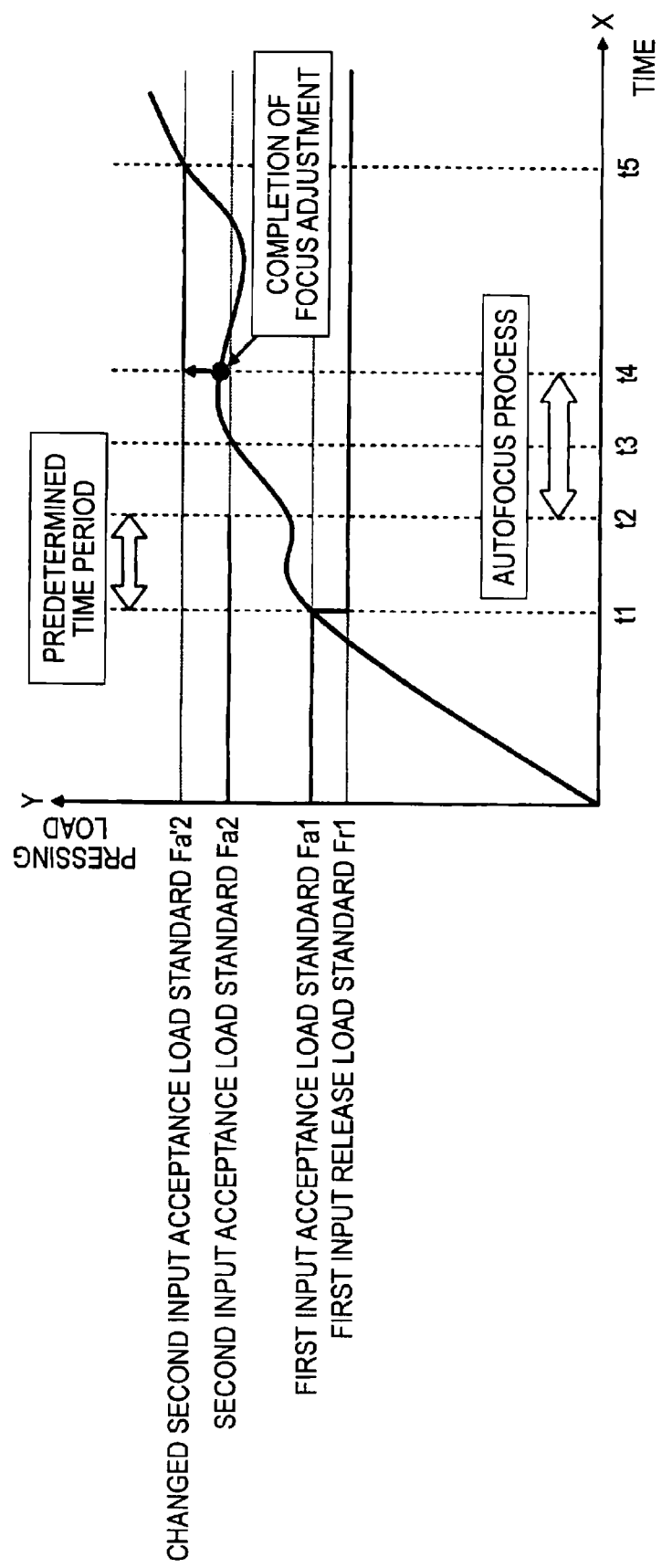
FIG. 3 is a graph illustrating about changing of a pressing load detected by a load detecting unit of the electronic device according to the first embodiment of the present invention.

FIG. 3 is a graph illustrating about changing of the pressing load detected by the load detecting unit 12. An X-axis direction represents the passage of time, and a Y-axis direction represents the pressing load detected by the load detecting unit 12. In FIG. 3, the time point at which the user touches the touch face 11a of the touch sensor 11 is the original point, and the pressing load at that time is 0.

After touching the touch face 11a, when the user applies a pressing force to the touch face 11a, the pressing load detected by the load detecting unit 12 increases with time. At a time point t1, the pressing load detected by the load detecting unit 12 reaches (satisfies) the first input acceptance load standard Fa1, so that the first-level input is accepted. At this time, the control unit 17 controls the touch-sense presenting unit 13 so that the touch-sense presenting unit 13 presents the touch sense to the touch object being in touch with the touch face 11a. Therefore, the user can see that the first-level input has been accepted.

Next, when the user adjusts the pressing force so that the load detecting unit 12 detects a pressing load, which satisfies the first input release load standard Fr1 and dose not satisfy the second input acceptance load standard Fa2, for the predetermined time period, the control unit 17 starts the autofocus process from a time point t2. When the autofocus process starts, the control unit 17 determines that the adjustment of the focus is not appropriate for acquiring a still image until the adjustment of the focus with respect to the photographic subject is completed, and controls so that, even if the load detecting unit 12 detects a pressing load that satisfies the second input acceptance load standard Fa2 (a time point t3), any still image including the photographic subject is not acquired. According this control, it is unlikely to erroneously acquire a still image in which the photographic subject is out of focus.

When the adjustment of the focus with respect to the photographic subject is completed at a time point t4 by the autofocus process, the new second input acceptance load standard Fa'2 is set on the basis of the pressing load detected at that time by the load detecting unit 12. In a case of determining whether to acquire a still image on the basis of the unchanged second input acceptance load standard Fa2 without using the changed second input acceptance load standard Fa'2, if a pressing load that satisfies the unchanged second input acceptance load standard Fa2 is detected from when the autofocus process starts to when the adjustment of the focus is completed, and the pressing load detected by the load detecting unit 12 satisfies the unchanged second input acceptance load standard Fa2 at a time when the adjustment of the focus is completed, a still image is acquired at the same time as the completion of the focus adjustment. Since the user cannot generally know when the autofocus process will finish, the still image may be acquired at an unintended timing. Therefore, in the present embodiment, the new second input acceptance load standard Fa'2 is set on the basis of the pressing load detected by the load detecting unit 12 when the focus adjustment is completed. As described above, the new second input acceptance load standard is set, unless the user intentionally increases the pressing force when the photographic subject is in focus, so that any still image is not acquired.

After the autofocus process is completed, when the user intentionally increases the pressing force so that the load detecting unit 12 detects a pressing load that satisfies the changed second input acceptance load standard Fa'2 (a time point t5), it is possible to acquire a still image.

As described above, according to the present embodiment, from when the autofocus process starts to when the adjustment of the focus with respect to the photographic subject is completed, control is performed so that, even if the load detecting unit 12 detects a pressing load that satisfies the second input acceptance load standard Fa2, any still image including the photographic subject is not acquired. Therefore, it is possible to reduce a risk that a still image in which the photographic subject is out of focus will be erroneously acquired.

Second Embodiment

Next, an electronic device according to a second embodiment of the present invention will be described. The second embodiment of the present invention is changed in the processes after step S106 of starting the autofocus process described in the above-mentioned first embodiment with reference to FIG. 2. The electronic device according to the second embodiment can be implemented by the same configuration as that of the electronic device described in the first embodiment, and is different from the electronic device according to the first embodiment in the process and operation of the control unit 17. Therefore, the same explanation as that in the above-mentioned first embodiment, and a description of the same effects as those of the first embodiment will be appropriately omitted.

Figure 4:
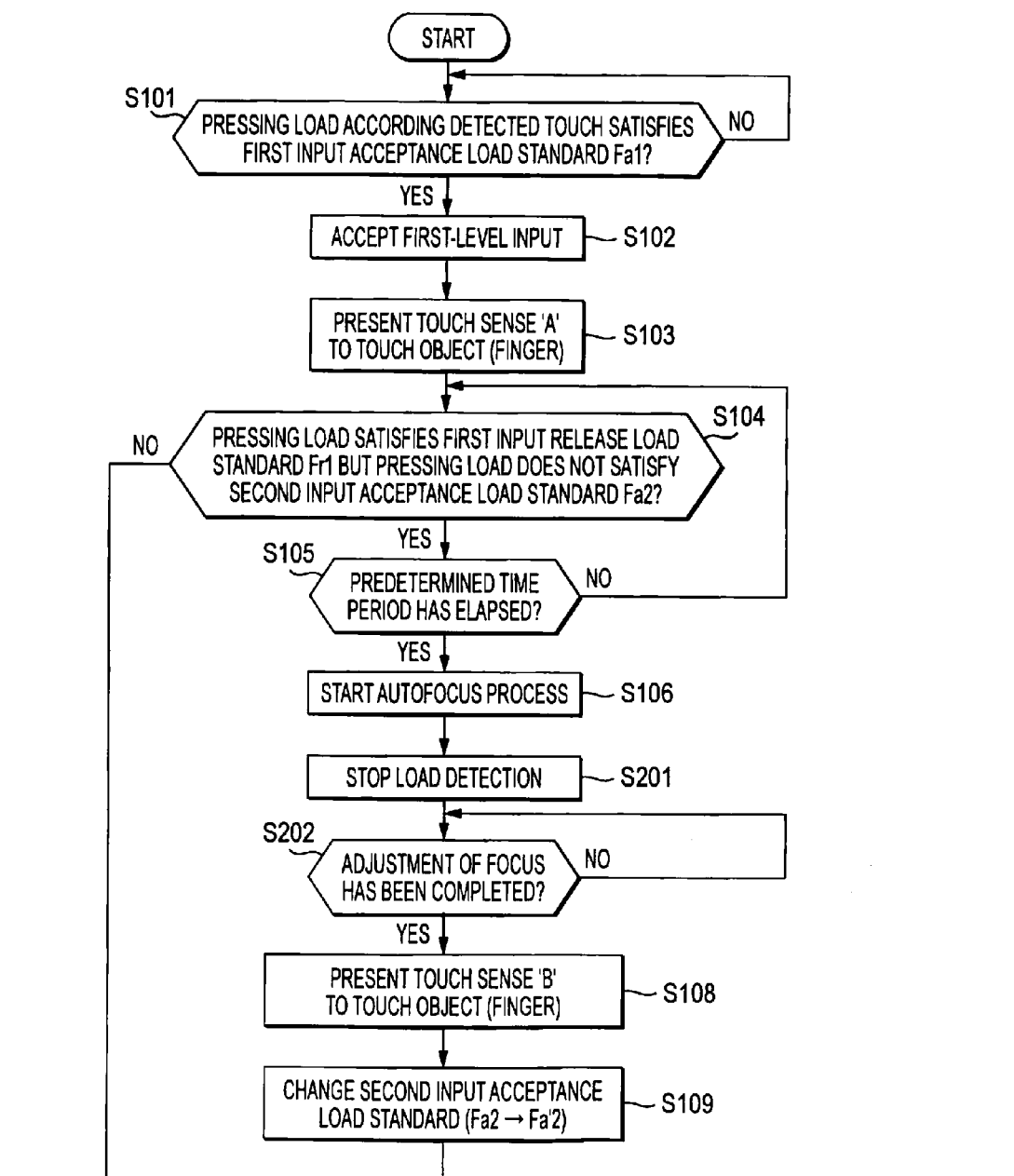
FIG. 4 is a flow chart illustrating an input process of an electronic device according to a second embodiment of the present invention.

With respect to the second embodiment, an input process will be described with reference to the flow chart of FIG. 4. Further, the same processes as those in the flow chart of FIG. 2 according to the first embodiment are denoted by the same step numerals as those in FIG. 2, and a description thereof will be omitted.

In the second embodiment, after the autofocus process starts in step S106, the control unit 17 stops the load detection of the load detecting unit 12 (step S201). After the load detection stops, the control unit 17 determines whether the adjustment of the focus with respect to the photographic subject has been completed based on the autofocus process, and does not proceed to the next step until the adjustment of the focus is completed (step S202). In case that it is determined in step S202 that the adjustment of the focus with respect to the photographic subject has been completed, the control unit 17 performs step S108 and step S109, similarly to the first embodiment. Next, the control unit 17 restarts the load detection of the load detecting unit 12 (step S203). The subsequent steps of step S203 are the same as those of the first embodiment.

Figure 5:
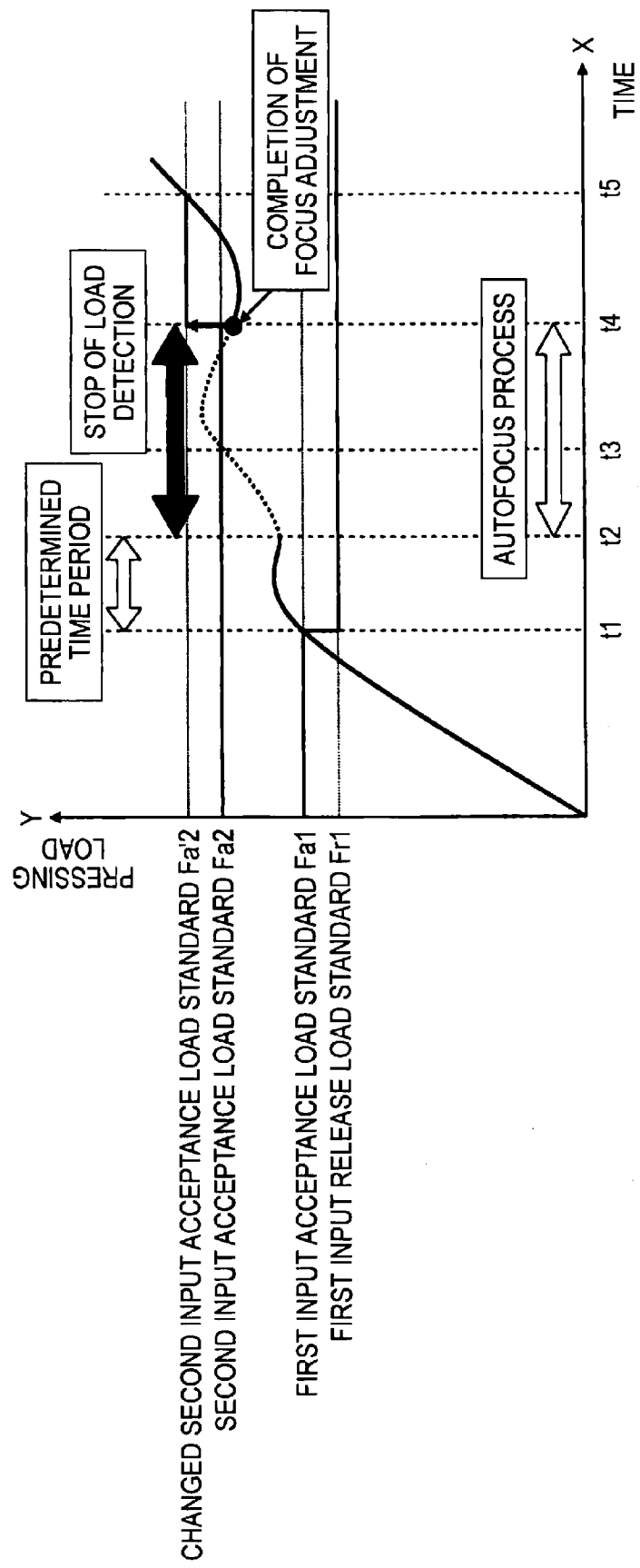
FIG. 5 is a graph illustrating about changing of a pressing load detected by a load detecting unit of the electronic device according to the second embodiment of the present invention.

FIG. 5 is a graph illustrating about changing of the pressing load detected by the load detecting unit 12. An X-axis direction represents the passage of time, and a Y-axis direction represents the pressing load detected by the load detecting unit 12. In FIG. 5, the time point at which the user touches the touch face 11a of the touch sensor 11 is the original point, and the pressing load at that time is 0.

In the second embodiment, when the autofocus process starts at the time point t2, the control unit 17 stops the pressing-load detecting process of the load detecting unit 12. When the adjustment of the focus with respect to the photographic subject is completed at the time point t4, the control unit 17 restarts the pressing-load detecting process of the load detecting unit 12. Therefore, since the load detection is not performed from when the autofocus process starts to when the adjustment of the focus with respect to the photographic subject is completed, the load detecting unit 12 does not detect any pressing load that satisfies the second input acceptance load standard. Therefore, it is possible to reduce a risk that a still image will be acquired in a state in which the photographic subject is out of focus.

Third Embodiment

Next, an electronic device according to a third embodiment of the present invention will be described. Unlike the first and second embodiments, in the third embodiment, when the load detecting unit 12 detects an amount of load change exceeding a predetermined amount of load change per unit time, the control unit 17 acquires a still image. The electronic device according to the third embodiment can be implemented by the same configuration as that of the electronic device described in the first embodiment, and is different from the electronic device according to the first embodiment in the process and operation of the control unit 17. Therefore, the same explanation as that in the above-mentioned second embodiment, and a description of the same effects as those of the second embodiment will be appropriately omitted.

Figure 6:
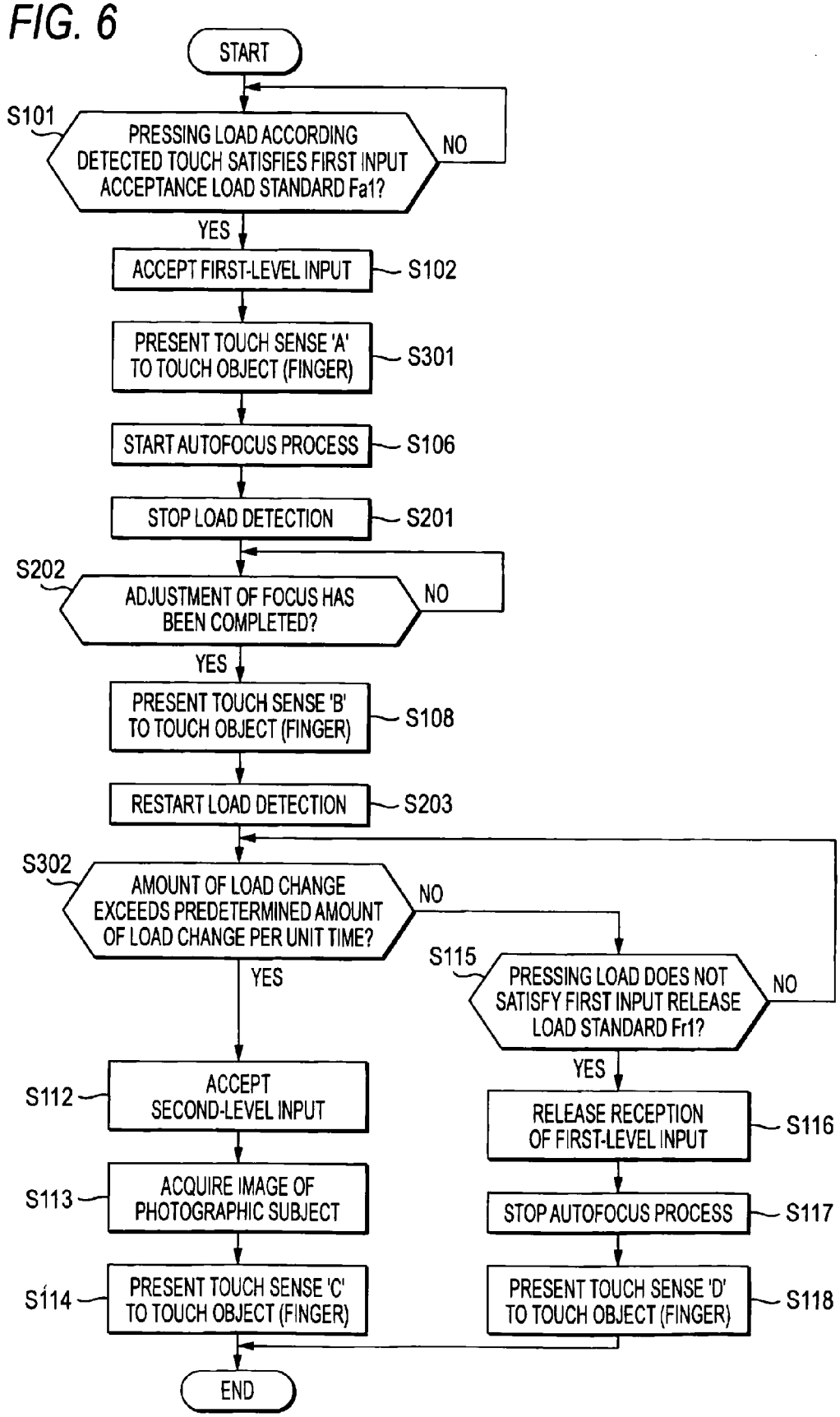
FIG. 6 is a flow chart illustrating an input process of an electronic device according to a third embodiment of the present invention.

With respect to the third embodiment, an input process will be described with reference to the flow chart of FIG. 6. Further, in the flow chart of FIG. 6, the same processes as those in FIG. 2 or 4 are denoted by the same step numerals as those in FIG. 2 or 4.

In the third embodiment, in case that it is determined in step S101 that the pressing load detected by the load detecting unit 12 satisfies the first input acceptance load standard Fa1, the control unit 17 accepts the first-level input (step S102), and controls the touch-sense presenting unit 13 so that the touch-sense presenting unit 13 presents a touch sense to the touch object being in touch with the touch face 11a (step S301). In the present embodiment, after step S301, the control unit 17 proceeds to step S106 with omitting the processes of step S104 and step S105 described with reference to the flow charts FIGS. 2 and 4 according to the first and second embodiments.

Further, after restarting the pressing-load detection of the load detecting unit 12 in step S203, the control unit 17 determines whether the load detecting unit 12 has detected the amount of load change exceeding the predetermined amount of load change per unit time (step S302). In case that it is determined that the load detecting unit 12 has detected an amount of load change exceeding the predetermined amount of load change per unit time, the control unit 17 performs the processes of step S112, step S113, and step S114, similarly to the second embodiment. Meanwhile, in case that it is determined that the load detecting unit 12 has not detected the amount of load change exceeding the predetermined amount of load change per unit time, the control unit 17 performs the process of step S115, similarly to the second embodiment.

Figure 7:
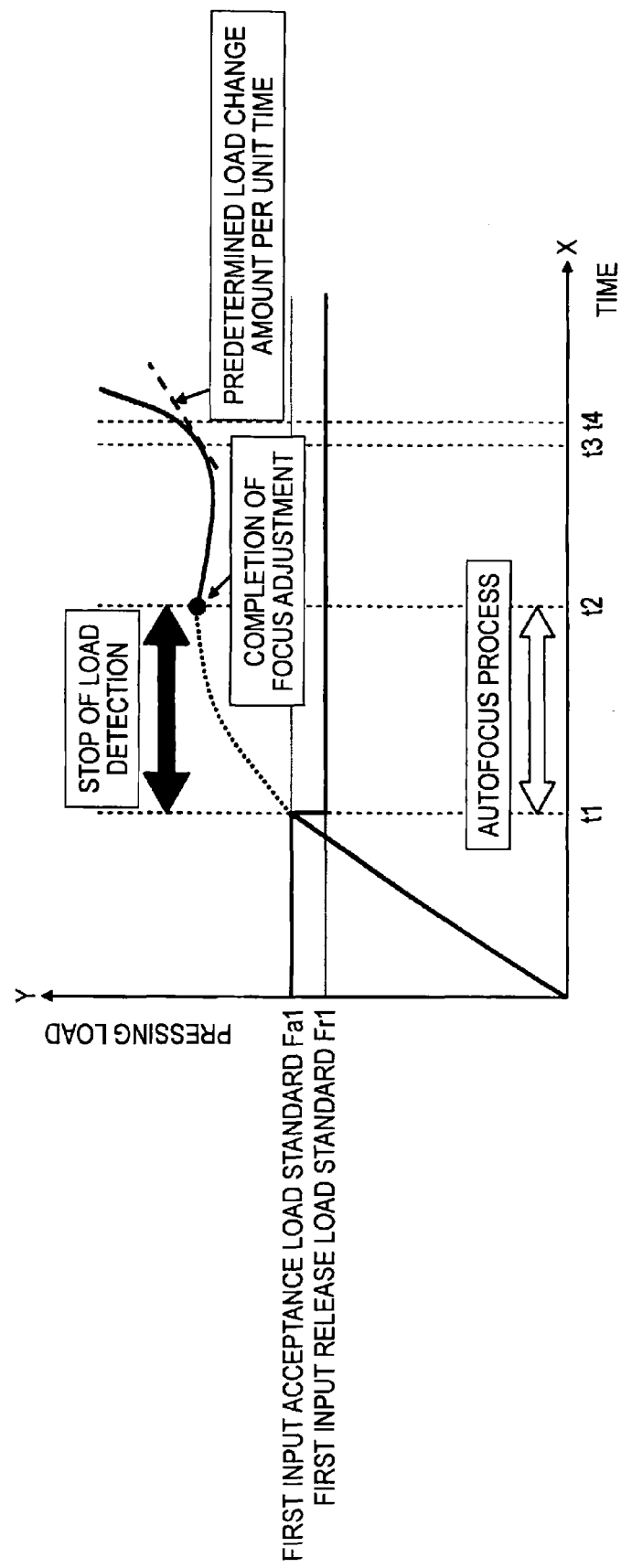
FIG. 7 is a graph illustrating about changing of a pressing load detected by a load detecting unit of the electronic device according to the third embodiment of the present invention.
Figure 8:
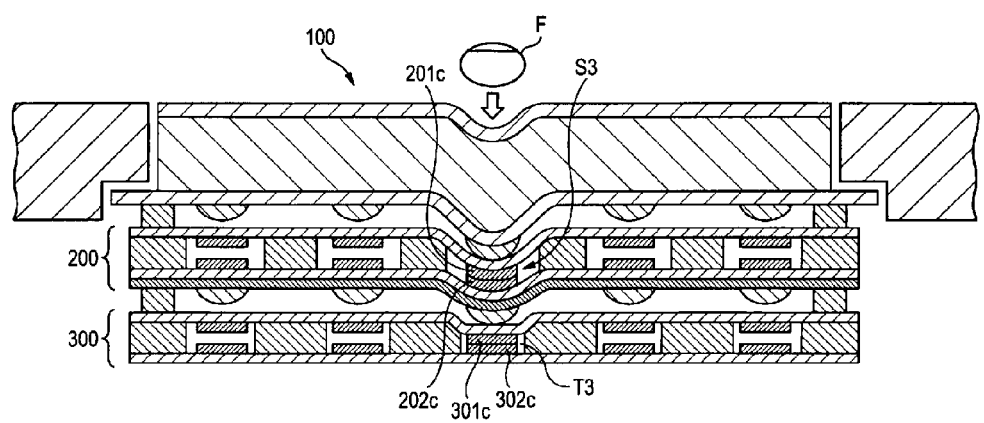
FIG. 8 is a cross-sectional view schematically illustrating an internal configuration of a manipulation device according to the related art.

FIG. 7 is a graph illustrating about changing of the pressing load detected by the load detecting unit 12. An X-axis direction represents the passage of time, and a Y-axis direction represents the pressing load detected by the load detecting unit 12. In FIG. 7, the time point at which the user touches the touch face 11a of the touch sensor 11 is the original point, and the pressing load at that time is 0.

In the third embodiment, after the autofocus process is completed at the time point t2, when the load detecting unit 12 detects an amount of load change exceeding the predetermined amount of load change per unit time, the control unit 17 acquires a still image of the photographic subject (the time point t4).

In the third embodiment, after the adjustment of the focus with respect to the photographic subject is completed, when the load detecting unit 12 detects an amount of load change exceeding the predetermined amount of load change per unit time, a still image is obtained. Therefore, it is possible to reduce a risk that a still image will be acquired in a state in which the photographic subject is out of focus.

Although the present invention has been described based on all of the drawings and the embodiments, it is noted that it is easy for those skilled in the art to make various changes and modifications based on the present disclosure. Therefore, it is noted that those changes and modifications are included in the scope of the present invention.

In the present embodiment, from when the autofocus process starts to when the adjustment of the focus with respect to the photographic subject is completed, it is controlled so that any still image is not acquired. However, the present invention is not limited thereto. For example, it is possible to apply that process to an auto exposure process. For example, when the load detecting unit 12 detects a pressing load that satisfies the first input acceptance load standard, the autofocus process may start. After the autofocus process starts, the stop of the imaging unit 14 and the like may be controlled so that any still image is not acquired, until appropriate exposure is determined. Also, similarly, when the load detecting unit 12 detects a pressing load that satisfies the first input acceptance load standard, the autofocus process and the auto exposure process may start. After the autofocus process and the auto exposure process start, control may be performed so that any still image is not acquired, until a later time point of the time point when the adjustment of the focus with respect to the photographic subject is completed and the time point when appropriate exposure is determined.

Further, in the present invention, the located position of the touch sensor 11 is not specifically limited, and the touch sensor 11 may be appropriately located. For example, instead of a release button of a camera or the like, the touch sensor 11 according to the present invention may be disposed, and the touch sensor 11 and the display unit 16 may be integrated to constitute a configuration like a so-called touch panel.

Meanwhile, although the processes of step S104 and step S105 are performed in the first and second embodiments, they may be omitted. In other words, after the process of step S103 is performed, the process of step S106 may be performed. According to this configuration, when the load detecting unit 12 detects a pressing load that satisfies the first input acceptance load standard, the autofocus process starts before a predetermined time period elapses.

Further, the display unit 16 and the touch sensor 11 in the description of the present embodiment may be configured by an integrated device obtained by giving the functions of both of them to a common board. As an example of the configuration of that device obtained by integrating the functions of both of the display unit 16 and the touch sensor 11, there is a device in which a plurality of photoelectric conversion elements such as photodiodes are regularly mixed in a group of pixel electrodes arranged in matrix in a liquid crystal panel. This device display an image according to the liquid crystal panel structure, and also detect a touch position by receiving reflected light of light of a backlight for liquid crystal display by the fore end of a pen for performing input by touching a desired position of a panel face, by photoelectric conversion elements neighboring the touch position.

Further, when a pressure is applied, a piezoelectric element generates electric power, and when electric power is applied, the piezoelectric element is deformed. Therefore, it is possible to use piezoelectric elements to integrate the load detecting unit 12 and the touch-sense presenting unit 13. Furthermore, since the touch sensor 11 can detect a change in resistance per unit time and a change in capacitance per unit time, the load detecting unit 12 and the touch sensor 11 can be integrated.

The invention claimed is:

1. An electronic device, which accepts inputs in a plurality of levels according to pressing loads, comprising:
   an imaging unit, which acquires an image of a photographic subject;
   a load detecting unit, which detects a pressing load; and
   a control unit, which is configured to:
      perform an autofocus process of automatically adjusting a focus with respect to the photographic subject when the load detecting unit detects a first pressing load satisfying a first load standard,
      control so that a still image is acquired, if the autofocus process is completed when the load detecting unit detects a second pressing load satisfying a second load standard higher than the first load standard,
      control so that the still image is not acquired, if the autofocus process is not completed when the load detecting unit detects the second pressing load, and
      after the adjustment of the focus with respect to the photographic subject is completed, adjust the second load standard to a third load standard higher than the pressing load being detected by the load detecting unit when the adjustment of the focus is completed.

* * * * *